(12) United States Patent
Juvenelle

(10) Patent No.: US 9,500,147 B2
(45) Date of Patent: Nov. 22, 2016

(54) MINIMIZATION OF THE COMBUSTION NOISE OF AN INTERNAL COMBUSTION ENGINE BASED ON A DETECTION OF AN INSTABILITY OF THE POSITION OF THE MAXIMUM OF A CYLINDER PRESSURE GRADIENT

(71) Applicant: Continental Automotive GmbH, Hannover (DE)

(72) Inventor: Cyril Juvenelle, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 167 days.

(21) Appl. No.: 14/403,615

(22) PCT Filed: May 21, 2013

(86) PCT No.: PCT/EP2013/060360
§ 371 (c)(1),
(2) Date: Nov. 25, 2014

(87) PCT Pub. No.: WO2013/174786
PCT Pub. Date: Nov. 28, 2013

(65) Prior Publication Data
US 2015/0144106 A1 May 28, 2015

(30) Foreign Application Priority Data

May 25, 2012 (DE) .......................... 10 2012 208 784

(51) Int. Cl.
*F02D 35/02* (2006.01)
*F02D 41/00* (2006.01)
*F02D 41/30* (2006.01)
(Continued)

(52) U.S. Cl.
CPC ........... *F02D 35/023* (2013.01); *F02D 35/028* (2013.01); *F02D 41/0002* (2013.01);
(Continued)

(58) Field of Classification Search
CPC ...... F02D 35/02; F02D 41/00; F02D 35/023; F02D 41/005; F02D 41/0002; F02D 41/40; F02D 35/028; Y02T 10/42
See application file for complete search history.

(56) References Cited

U.S. PATENT DOCUMENTS

| 6,941,907 B2 * | 9/2005 | Dixon ...................... F02B 1/12 123/48 A |
| 7,778,762 B2 | 8/2010 | Loeffler et al. ............... 701/103 |

(Continued)

FOREIGN PATENT DOCUMENTS

| DE | 102005058820 A1 | 6/2007 | ............. F02D 41/00 |
| DE | 102008000552 A1 | 9/2009 | ............. F02D 41/00 |
| EP | 1746278 A2 | 1/2007 | |

(Continued)

OTHER PUBLICATIONS

International Search Report and Written Opinion, Application No. PCT/EP2013/060360, 16 pages, Oct. 10, 2013.

(Continued)

*Primary Examiner* — Hieu T Vo
(74) *Attorney, Agent, or Firm* — Slayden Grubert Beard PLLC

(57) ABSTRACT

A method and a device for regulating the combustion noise of an internal combustion engine includes operating the internal combustion engine, detecting a profile of the cylinder pressure in the engine over time, determining a profile of the gradient of the cylinder pressure over time, defining the temporal position of the maximum of the pressure gradient in the determined profile, and modifying at least one parameter that is relevant to the combustion of fuel in the engine, wherein the pressure profile is detected, the pressure gradient is determined, and the temporal position of the maximum of the pressure gradient is defined until the temporal position of the maximum of the pressure gradient begins to fluctuate within a plurality of engine combustion cycles that follow one another. Furthermore, an engine controller having such a device and a computer program for carrying out such a method are described.

15 Claims, 2 Drawing Sheets

(51) Int. Cl.
*F02D 41/24* (2006.01)
*F02D 41/40* (2006.01)

(52) U.S. Cl.
CPC ............ *F02D41/30* (2013.01); *F02D 41/40* (2013.01); *F02D 41/005* (2013.01); *F02D 41/2451* (2013.01); *F02D 41/402* (2013.01); *Y02T 10/42* (2013.01)

(56) References Cited

U.S. PATENT DOCUMENTS

| | | | |
|---|---|---|---|
| 8,032,293 B2 | 10/2011 | Binder et al. | 701/111 |
| 8,239,116 B2 | 8/2012 | Jung et al. | 701/103 |

FOREIGN PATENT DOCUMENTS

| | | | | |
|---|---|---|---|---|
| EP | 1746278 A2 | 1/2007 | | F02D 21/08 |
| JP | 2006009600 A | 1/2006 | | F02D 41/14 |
| WO | 2008/034754 A1 | 3/2008 | | F02D 35/02 |
| WO | 2013/174786 A1 | 11/2013 | | F02D 35/02 |

OTHER PUBLICATIONS

Chinese Office Action, Application No. 201380027373.1, 13 pages, Jun. 30, 2016.

* cited by examiner

MINIMIZATION OF THE COMBUSTION NOISE OF AN INTERNAL COMBUSTION ENGINE BASED ON A DETECTION OF AN INSTABILITY OF THE POSITION OF THE MAXIMUM OF A CYLINDER PRESSURE GRADIENT

CROSS-REFERENCE TO RELATED APPLICATIONS

This application is a U.S. National Stage Application of International Application No. PCT/EP2013/060360 filed May 21, 2013, which designates the United States of America, and claims priority to DE Application No. 10 2012 208 784.2 filed May 25, 2012, the contents of which are hereby incorporated by reference in their entirety.

TECHNICAL FIELD

The present invention relates generally to the operation of an internal combustion engine. The present invention relates in particular to a method and a device for regulating the combustion noise generated by an internal combustion engine. The present invention also relates to an engine controller having a device of said type, and to a computer program for carrying out a method of said type for regulating the combustion noise of an internal combustion engine.

BACKGROUND

Diesel fuel combustion processes and newer Otto-cycle combustion processes (for example so-called Gasoline Homogeneous Charge Compression Ignition (HCCI) processes or Controlled Auto Ignition (CAI) processes) differ from conventional applied-ignition processes in that the ignition of the fuel is triggered not by applied ignition, for example by means of an ignition plug, but by the mixing of a fuel and re-introduced exhaust gas at an elevated temperature. In this case, relatively homogeneous mixture formation occurs before the ignition, which normally leads to a multiplicity of exothermic centers in the combustion chamber. The actual combustion of the fuel thus takes place relatively uniformly and very rapidly, which in turn leads to reduced fuel consumption and to reduced pollutant emissions.

The temporal position of an auto-initiated fuel combustion is often specified in terms of a crankshaft angle. It is preferable for the temporal position of a specific energy conversion of the combustion to be used for this purpose. For example, the center of combustion may be specified as MFB50 (Mass Fraction Burnt 50%) or HR50 (Heat Release 50%).

In the case of an auto-ignition internal combustion engine, however, there is no direct trigger for the initiation of the combustion, such as for example an ignition spark of an ignition plug. For this reason, relatively large, cylinder-specific differences may arise with regard to the progression of the combustion. This also applies with regard to combustion noise, which contributes to undesired acoustic emissions of an internal combustion engine.

For the adjustment, and in particular for the reduction, of combustion noise, it is known for combustion-relevant parameters relating to the fuel path and the air path to be varied.

DE 10 2008 000 552 A1 describes a method for the operation of an auto-ignition internal combustion engine, in which the following steps are performed: (a) pre-definition of a setpoint combustion position and of a setpoint combustion noise feature; (b) operation of a cylinder of the internal combustion engine for at least one cycle, maintaining a predefined first injector and/or air valve actuation variable and a predefined second injector and/or air valve actuation variable; (c) ascertainment of an actual combustion position and an actual combustion noise feature of the cylinder; (d) comparison of the actual combustion position with the setpoint combustion position and, if the actual combustion position deviates from the setpoint combustion position, re-determination of the first injector and/or air valve actuation variable; and (e) comparison of the actual combustion noise feature with the setpoint combustion noise feature and, if the actual combustion noise feature deviates from the setpoint combustion noise feature, re-determination of the second injector and/or air valve actuation variable. In this case, as an actual combustion noise feature, use may be made of a maximum pressure gradient in the cylinder, because the maximum pressure gradient of the combustion process correlates with the combustion noise. The maximum pressure gradient can be determined in a simple manner by means of a cylinder pressure acquisition system.

SUMMARY

One embodiment provides a method for regulating the combustion noise of an internal combustion engine, in particular of an auto-ignition internal combustion engine, the method including: operation of the internal combustion engine, acquisition of the profile with respect to time of the pressure in a cylinder of the internal combustion engine, ascertainment of the profile with respect to time of a pressure gradient which is the derivative with respect to time of the acquired profile with respect to time of the pressure, determination of the temporal position of the maximum of the pressure gradient in the ascertained profile with respect to time, and modification of at least one parameter which is relevant for the combustion of fuel in the internal combustion engine, wherein furthermore, the profile with respect to time of the pressure is acquired, the profile with respect to time of the pressure gradient is ascertained, and the temporal position of the maximum of the pressure gradient is determined until the temporal position of the maximum of the pressure gradient begins to fluctuate within a multiplicity of successive working cycles of the internal combustion engine.

In a further embodiment, the temporal position is determined with reference to a crankshaft angle of the internal combustion engine.

In a further embodiment, the at least one parameter relates to a fuel supply path for the internal combustion engine.

In a further embodiment, the at least one parameter relates to an air supply path for the internal combustion engine.

In a further embodiment, the internal combustion engine is operated with multiple injection processes in each working cycle, wherein the temporal position of the maximum of the pressure gradient within the multiplicity of successive working cycles is assigned to different injection processes.

In a further embodiment, the method further includes renewed modification of the at least one parameter until the temporal position of the maximum of the pressure gradient is stable again within a multiplicity of successive working cycles of the internal combustion engine.

In a further embodiment, the method further includes: storage of the value and of the temporal position of the maximum pressure gradient within a working cycle as a setpoint value or setpoint position after the temporal position of the maximum of the pressure gradient is stable again within a multiplicity of successive working cycles of the internal combustion engine after the renewed modification of the at least one parameter, and operation of the internal combustion engine such that (i) the value of the maximum pressure gradient within a working cycle is at least approximately the setpoint value, and/or (ii) the temporal position of the maximum pressure gradient within a working cycle is at least approximately the setpoint position.

Another embodiment provides a device for regulating the combustion noise of an internal combustion engine, in particular of an auto-ignition internal combustion engine, the device comprising: a control unit for the operation of the internal combustion engine, an acquisition unit for acquiring the profile with respect to time of the pressure in a cylinder of the internal combustion engine, an ascertainment unit for ascertaining the profile with respect to time of a pressure gradient which is the derivative with respect to time of the acquired profile with respect to time of the pressure, a determination unit for determination of the temporal position of the maximum of the pressure gradient in the determined profile with respect to time, and a modification unit for modification of at least one parameter which is relevant to the combustion of fuel in the internal combustion engine, wherein furthermore, the profile with respect to time of the pressure is acquired by means of the acquisition unit the profile with respect to time of the pressure gradient is ascertained by means of the ascertainment unit, and the temporal position of the maximum of the pressure gradient is determined by means of the determination unit until the temporal position of the maximum of the pressure gradient begins to fluctuate within a multiplicity of successive working cycles of the internal combustion engine.

Another embodiment provides an engine controller for an internal combustion engine of a motor vehicle, e.g., for an auto-ignition internal combustion engine of a motor vehicle, the engine controller including a device as disclosed above for regulating the combustion noise of an internal combustion engine of a motor vehicle.

Another embodiment provides a computer program for regulating the combustion noise of an internal combustion engine, e.g., an auto-ignition internal combustion engine, wherein the computer program, when executed on a processor, is set up for performing the method disclosed above.

BRIEF DESCRIPTION OF THE DRAWINGS

Example embodiments re discussed in detail below with reference to the drawings, in which.

DETAILED DESCRIPTION

Figure 1:
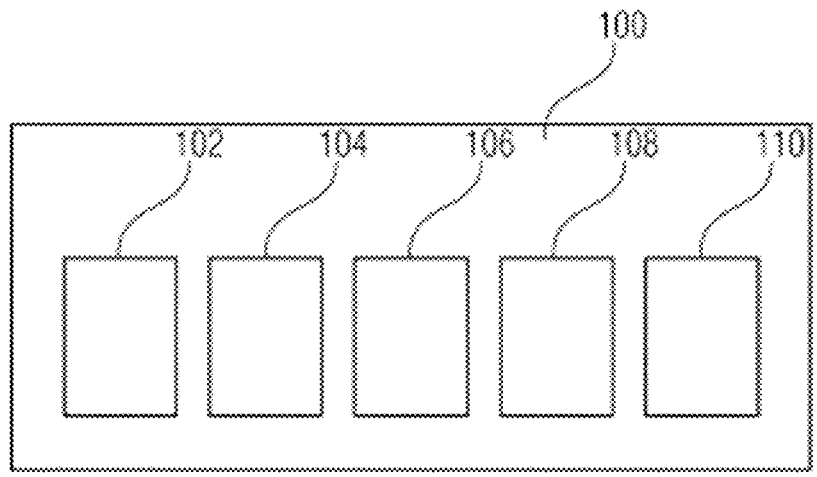
FIG. 1 shows a device for regulating the combustion noise of an internal combustion engine.

Embodiments of the invention are provided to reduce the combustion noise of an internal combustion engine in a simple and reliable manner.

Some embodiments provide a method for regulating the combustion noise of an internal combustion engine, in particular of an auto-ignition internal combustion engine, is described. The described method has (a) operation of the internal combustion engine, (b) acquisition of the profile with respect to time of the pressure in a cylinder of the internal combustion engine, (c) ascertainment of the profile with respect to time of a pressure gradient which is the derivative with respect to time of the acquired profile with respect to time of the pressure, (d) determination of the temporal position of the maximum of the pressure gradient in the ascertained profile with respect to time, and (e) modification of at least one parameter which is relevant for the combustion of fuel in the internal combustion engine, wherein furthermore, (i) the profile with respect to time of the pressure is acquired, (ii) the profile with respect to time of the pressure gradient is ascertained, and (iii) the temporal position the maximum of the pressure gradient is determined until the temporal position of the maximum of the pressure gradient begins to fluctuate within a multiplicity of successive working cycles of the internal combustion engine.

The described method is based on the realization that the combustion noise of an internal combustion engine is particularly low if the maximum pressure gradient, which is characteristic of the intensity of the combustion noise, is no longer uniquely assigned to a particular phase of the working cycle of the internal combustion engine. Such a desired absence of a unique assignment of the maximum pressure gradient is manifested in fluctuations or an instability of the temporal position of the maximum pressure gradient.

The internal combustion engine may be an Otto-cycle engine without applied ignition, or a diesel engine. The internal combustion engine may have one cylinder or preferably multiple cylinders. In the case of an internal combustion engine with multiple cylinders, the described method can be carried out for one cylinder, for multiple cylinders together or for multiple cylinders separately, that is to say with individual modification of the combustion-relevant parameters of the individual cylinders. The supply of fuel to the at least one cylinder of the internal combustion engine is performed in particular by means of so-called fuel injection, which is performed for each cylinder by means of at least one fuel injector which is connected to a pressurized fuel line (for example a common rail).

The pressure in the cylinder, which in this document is also referred to for short as cylinder (internal) pressure, may be measured in a known way by means of a pressure sensor which is coupled for example to the cylinder interior. The pressure gradient may be ascertained or calculated by means of a processing unit connected downstream of a pressure sensor. Said processing unit may be implemented in an engine controller of the internal combustion engine.

In this document, the expression "working cycle" may be understood in particular to mean the entirety of the four strokes of a four-stroke engine, which in a known manner encompass an intake stroke, a compression stroke, a working stroke and an exhaust stroke.

The modification of the at least one combustion-relevant parameter may be performed automatically through the use of an algorithm, wherein one or more combustion-relevant parameters are modified in a predetermined manner. In this case, the manner may for example be stored in a characteristic map or a look-up table. The manner of the modification of the at least one combustion-relevant parameter may also be dependent on the present operating state of the internal combustion engine.

If a first modification with regard to the combustion noise is disadvantageous (that is to say the internal combustion engine becomes louder), then the at least one combustion-relevant parameter may be varied by means of a changed, second modification or modification strategy. Only when the respective maximum values of the pressure gradient occur at different times within a multiplicity of successive working cycles of the internal combustion engine can it then be assumed that the internal combustion engine is being operated in an at least approximately optimum operating state with regard to its generation of noise owing to combustion noise.

The implementation of the method, described in this document, for the regulation of the combustion noise of an internal combustion engine opens up completely new degrees of freedom, for control (without feedback) or regulation (with feedback) of the operation of an internal combustion engine, with regard to the "configurability" of the combustion progression. In this way, the acoustics of an internal combustion engine can even be improved at an early stage within the engine. The method described here furthermore affords the possibility of deviations caused by component tolerances, or by varying amounts of wear over the course of the life cycle of an internal combustion engine, being counteracted and the internal combustion engine always being operated such that, at all times, only the optimum or quietest, least possible combustion noise is generated.

In one embodiment, the temporal position is determined with reference to a crankshaft angle of the internal combustion engine. The reference to the crankshaft angle has the advantage that the measurement values which are acquired, and which are to be evaluated, in the method described here can be acquired and evaluated in a particularly simple manner. In particular, in the presence of varying or changing engine speeds, there is no need to perform a transformation of measured times into a present rotational angle.

It is pointed out that, with the use of the reference to the crankshaft angle (for example in degrees) instead of a reference to the time (for example in milliseconds), the pressure gradient is, in the strictly mathematical sense, not a temporal pressure gradient but a change in pressure per unit change in crankshaft angle. Then, the pressure gradient can be specified for example in the units of bar/angular degree.

In a further embodiment, the at least one parameter relates to a fuel supply path for the internal combustion engine.

The at least one combustion-relevant parameter relating to the fuel supply path may for example be the start of a fuel injection, the injection pressure of the fuel, the injection quantity of fuel, the number of discrete injection processes (pilot injection) and/or the respective injection quantities in the case of at least one pilot injection being implemented in addition to a main injection. The injection pressure may, in a known manner, be measured and/or set at a fuel supply system, for example at a so-called common rail system. It is however pointed out that the list of combustion-relevant parameters given here is not exhaustive.

The use of at least one of the combustion-relevant parameters relating to the fuel supply path, as described here, has the advantage that the method described in this document can be implemented with conventional internal combustion engines and conventional fuel supply systems, without the need for modification of hardware of the internal combustion engine or fuel supply system.

In a further embodiment, the at least one parameter relates to an air supply path for the internal combustion engine.

The at least one combustion-relevant parameter relating to the air supply path may for example be a charge pressure with which the air required for the combustion process is forced into the respective cylinder of the internal combustion engine. Said charge pressure may, in a known manner, be generated for example by a turbocharger. The combustion-relevant parameter may furthermore be a rate for exhaust-gas recirculation, which in a known manner serves for supplying the respective cylinder with a mixture of air and exhaust gas from a preceding combustion process, instead of pure air. Here, too, it is pointed out that the list of combustion-relevant parameters relating to the air supply path as given here is not exhaustive.

The use of at least one of the combustion-relevant parameters relating to the air supply path, as described here, has the advantage that the method described in this document can be implemented with conventional internal combustion engines and conventional fuel supply systems, without the need for modification of hardware of the internal combustion engine or air supply system.

In a further embodiment, the internal combustion engine is operated with multiple injection processes in each working cycle, wherein the temporal position of the maximum of the pressure gradient within the multiplicity of successive working cycles is assigned to different injection processes. This means that at least one of the temporally jumping or fluctuating positions of the maximum of the pressure gradient is assigned to a pilot injection. If, as is inevitably the case for example with a multiple injection with only one pilot injection, another of the temporally jumping or fluctuating positions of the maximum of the pressure gradient is assigned to the main injection, then it can be assumed with certainty that the combustion noise or the pressure gradient of the pilot injection is at least no more intense than the combustion noise or the pressure gradient of the main injection. It can be ensured in this way that the combustion noise of the internal combustion engine is at least not unnecessarily high and that, with high probability, an at least approximately optimum operating state with regard to the combustion noise of the internal combustion engine is attained.

In a further embodiment, the method also has a renewed modification of the at least one parameter until the temporal position of the maximum of the pressure gradient is stable again within a multiplicity of successive working cycles of the internal combustion engine. This may mean in particular that the internal combustion engine is operated in a stable state again in which, as before, at least approximately optimum (that is to say minimal) combustion noise is produced and in which, furthermore, the maximum pressure gradient always occurs at at least approximately the same temporal position within a multiplicity of successive working cycles.

Expressed in descriptive terms, this may mean in particular that, as a result of the renewed modification, the variation of the combustion-relevant parameter performed in the first modification is made negligible again or is partially reversed, in order that a stable state with regard to the position of the occurrence of the maximum pressure gradient is attained.

In a further embodiment, the method also has (a) storage of the value and of the temporal position of the maximum pressure gradient within a working cycle as a setpoint value or setpoint position after the temporal position of the maximum of the pressure gradient is stable again within a multiplicity of successive working cycles of the internal combustion engine after the renewed modification of the at least one parameter, and (b) operation of the internal combustion engine such that (i) the value of the maximum pressure gradient within a working cycle is at least approximately the setpoint value, and/or (ii) the temporal position of the maximum pressure gradient within a working cycle is at least approximately the setpoint position.

Expressed in descriptive terms, this may mean in particular that, after a first optimization or minimization of the combustion noise that has been performed with the method described above, a second optimization is performed in which it is sought to operate the internal combustion engine such that the value of the maximum pressure gradient within a working cycle and/or the temporal position of the maximum pressure gradient within a working cycle is set such that the optimum setpoint value and/or the optimum setpoint position of the maximum pressure gradient is and/or are at least approximately attained within a working cycle. In this case, for the described second optimization, the same combustion-relevant parameters as in the first optimization may be varied.

Other embodiments provide a device for regulating the combustion noise of an internal combustion engine, in particular of an auto-ignition internal combustion engine, is described. The described device has (a) a control unit for the operation of the internal combustion engine, (b) an acquisition unit for acquiring the profile with respect to time of the pressure in a cylinder of the internal combustion engine, (c) an ascertainment unit for ascertaining the profile with respect to time of a pressure gradient which is the derivative with respect to time of the acquired profile with respect to time of the pressure, (d) a determination unit for determination of the temporal position of the maximum of the pressure gradient in the determined profile with respect to time, and (e) a modification unit for modification of at least one parameter which is relevant to the combustion of fuel in the internal combustion engine, wherein furthermore, (i) the profile with respect to time of the pressure is acquired by means of the acquisition unit, (ii) the profile with respect to time of the pressure gradient is ascertained by means of the ascertainment unit, and (iii) the temporal position of the maximum of the pressure gradient is determined by means of the determination unit until the temporal position of the maximum of the pressure gradient begins to fluctuate within a multiplicity of successive working cycles of the internal combustion engine.

The described device is also based on the realization that the combustion noise of an internal combustion engine is particularly low if the maximum pressure gradient, which is characteristic of the intensity of the combustion noise, is no longer uniquely assigned to a particular phase of the working cycle of the internal combustion engine. This means that no phase within the working cycle of the internal combustion engine is uniquely responsible, on its own, for the maximum pressure gradient and thus also for the sound level of the combustion noise. This relationship was identified by the inventor of the method described in this document, wherein specifically, the instability of the temporal position of the occurrence of the maximum pressure gradient within a working cycle is a criterion for the internal combustion engine presently being operated with combustion-relevant parameters that ensure minimal noise generation.

The individual components of the described device may be realized separately or in combination in a unit by means of which the corresponding functions can be implemented.

Other embodiments provide an engine controller for an internal combustion engine of a motor vehicle, in particular for an auto-ignition internal combustion engine of a motor vehicle, is described. The described engine controller has a device of the above-described type for regulating the combustion noise of an internal combustion engine of a motor vehicle.

The described engine controller is based on the realization that the above-described device can be implemented in an engine controller for an internal combustion engine of a motor vehicle, and that, in this way, based on exact knowledge of the optimum combustion-relevant parameters for minimal noise generation, the internal combustion engine can be suitably operated such that, overall, the noise generation by the internal combustion engine is minimized.

Other embodiments provide a computer program for regulating the combustion noise of an internal combustion engine, in particular of an auto-ignition internal combustion engine, is described. The described computer program, when executed on a processor, is set up for carrying out the above-described method for regulating the combustion noise of an internal combustion engine.

In the context of this document, the designation of a computer program of said type equates to a reference to a program element, a computer program product and/or a computer-readable medium which contains instructions for the control of a computer system in order to coordinate the operation of a system or a method in a manner suitable for attaining the effects associated with the method according to the invention.

The computer program may be implemented as computer-readable instruction code in any suitable programming language, such as for example Java, C++ etc. The computer program may be stored on a computer-readable storage medium (CD-ROM, DVD, Blu-ray disk, removable drive, volatile or non-volatile memory, installed memory or processor etc.). The instruction code may program a computer, or some other programmable device such as in particular a control unit for an internal combustion engine of a motor vehicle, such that the desired functions are carried out. Furthermore, the computer program may be provided in a network, such as for example the Internet, from which it can be downloaded by a user as required.

Some embodiments of the invention may be realized both by means of a computer program, that is to say by means of software, and by means of one or more special electric circuits, that is to say in hardware or any desired hybrid form, that is to say by means of software components and hardware components.

It is pointed out that the embodiments described below represent merely a limited selection of possible design variants of the invention. In particular, the features of individual embodiments may be suitably combined with one another, such that, with the design variants explicitly presented here, a multiplicity of different embodiments are to be regarded as being disclosed in obvious fashion to a person skilled in the art.

FIG. 1 shows a device 100 for regulating the combustion noise of an internal combustion engine. The device 100 or some components of the device 100 may be implemented in an engine controller for a motor vehicle. The device 100 has (a) a control unit 102 for operating the internal combustion engine, (b) an acquisition unit 104 for acquiring the profile with respect to time of the pressure in a cylinder of the internal combustion engine, (c) an ascertainment unit 106 for ascertaining the profile with respect to time of a pressure gradient which is the derivative with respect to time of the acquired profile with respect to time of the pressure, and (d) a determination unit 108 for determining the temporal position of the maximum of the pressure gradient in the ascertained profile with respect to time. Furthermore, the device 100 also has a modification unit 110 by means of which at least one parameter which is relevant for the combustion of fuel in the internal combustion engine can be modified. The device 100 and in particular the control unit 102 is set up such that, during the modification or the variation of the at least one combustion-relevant parameter, furthermore, (i) the profile with respect to time of the pressure is acquired by means of the acquisition unit 104, (ii) the profile with respect to time of the pressure gradient is ascertained by means of the ascertainment unit 106, and (iii) the temporal position of the maximum of the pressure gradient is determined by means of the determination unit 108. The modification or the variation of the at least one combustion-relevant parameter is performed by the modification unit 110 until the temporal position of the maximum of the pressure gradient begins to fluctuate within a multiplicity of successive working cycles of the internal combustion engine. This means that the maximum pressure gradient, which is characteristic of the intensity of the combustion noise, is no longer uniquely assigned to a particular phase of the working cycle of the internal combustion engine. It is thereby ensured that, in particular in the case of a multiple injection, no phase, and in particular no pilot injection, leads to a higher pressure gradient, and thus more intense combustion noise generation, than the main injection. The presence of unnecessarily intense combustion noise can thus be reliably eliminated. The internal combustion engine is in an at least approximately optimum state with regard to its combustion noise.

Figure 2:
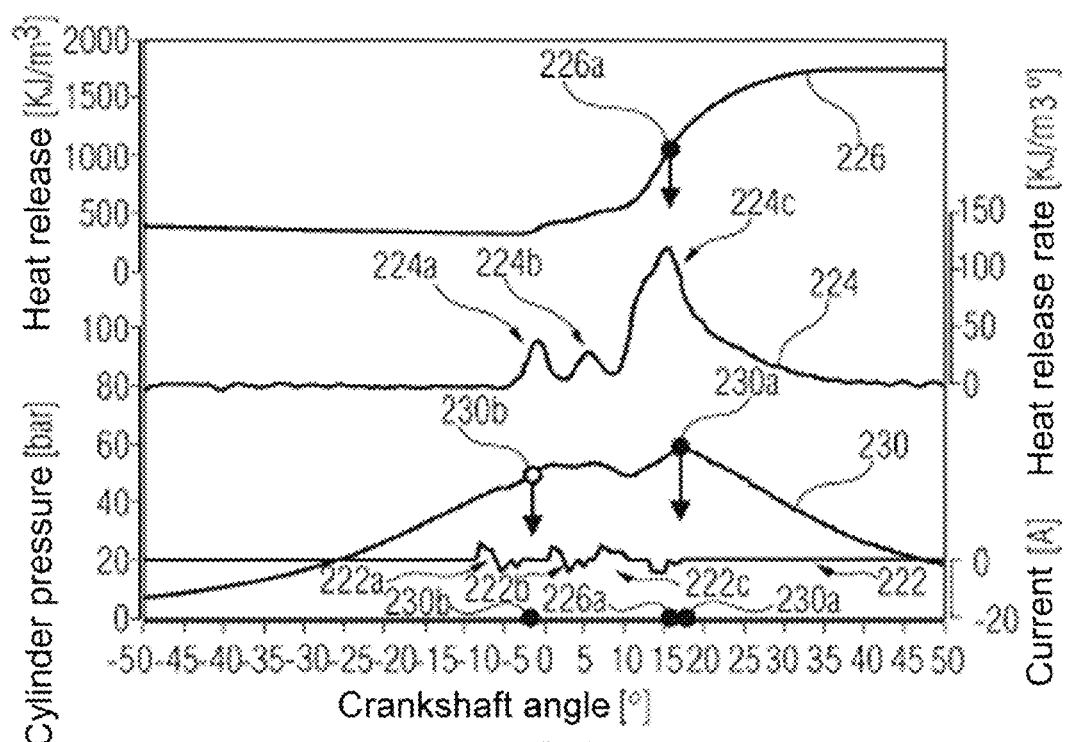
FIG. 2 shows a diagram which, within a working cycle and as a function of the crankshaft angle, illustrates the actuation of a piezo injector, the profile of the cylinder internal pressure, the profile of the heat release rate, and the profile of the heat release.

FIG. 2 illustrates a diagram 220 which, within a working cycle and as a function of the crankshaft angle, shows different variables which are relevant for a fuel combustion. The reference sign 222 denotes a current profile applied to a piezoelectric injector for the purpose of injecting fuel into a cylinder of the internal combustion engine in a known manner. The illustrated current profile 222 has three characteristic phases. A first phase 222a leads to a first pilot injection. A second phase 222b leads to a second pilot injection. A third phase 222c leads to a main injection.

The reference sign 224 denotes a curve illustrating the profile of the heat release rate. The curve 224 exhibits three pronounced maxima. A first maximum 224a is assigned to the first pilot injection 222a. A second maximum 224b is assigned to the second pilot injection 222b. The third maximum 224c is assigned to the main injection 224c. The assignments between the injections and the respectively corresponding maximum in the heat release rate are distinguished, in a known manner, by a certain time delay.

The reference sign 226 denotes a curve illustrating the profile of the heat release. The profile of the heat release 226 is obtained from the integral over the profile of the heat release rate 224. The so-called center of combustion HR50 (Heat Release 50%) lies at a crankshaft angle of approximately 16°. This means that, at the relevant time of the center of combustion HR50, half of the total heat released per working cycle has already been released. In FIG. 2, the position of the center of combustion HR50 is indicated in the curve 226 and on the abscissa by a respective circle denoted by the reference sign 226a.

The reference sign 230 denotes a curve illustrating the profile of the cylinder internal pressure as a function of the crankshaft angle. The profile of the cylinder internal pressure 230 has a maximum at a crankshaft angle of approximately 18°. In FIG. 2, the position of the maximum of the curve 230 is denoted by a circle provided with the reference sign 230a. The profile of the cylinder internal pressure 230 exhibits the steepest gradient at a crankshaft angle of approximately −2°. The maximum gradient is indicated in FIG. 2 by a circle provided with the reference sign 230b.

Expressed in descriptive terms, FIG. 2 illustrates an exemplary combustion profile and the pressure profile resulting from this in a cylinder or combustion chamber of an internal combustion engine. Of particular significance for the acoustics of the internal combustion engine are the steepness of the maximum pressure gradient and the (angular) position 230b of the maximum pressure gradient. These values are evaluable with the use of cylinder pressure acquisition at the internal combustion engine, and are available in an engine control unit.

In the exemplary embodiment illustrated here, the acoustics of the combustion are assessed on the basis of the two main characteristic variables: (a) the steepness of the maximum pressure gradient and (b) the position of the maximum pressure gradient evaluated with respect to the crankshaft angle of the internal combustion engine. In the situation illustrated, the maximum pressure gradient is identified during the combustion of the first pilot injection 224a. This means that, in this example, the first pilot injection 224a causes the main combustion noise.

In the exemplary embodiment illustrated here, to reduce the main combustion noise, use is made of a strategy described below on the basis of FIG. 3.

Figure 3:
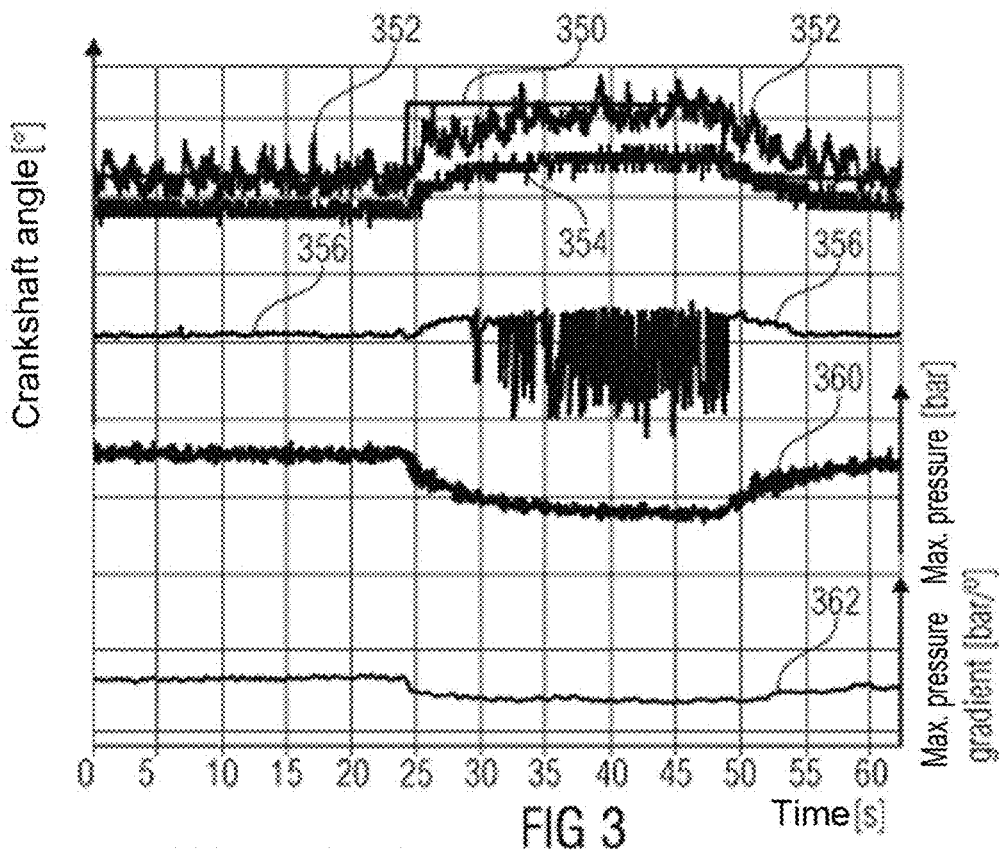
FIG. 3 shows a diagram illustrating how, as a function of the time, the position of a fuel injection is retarded with respect to a crankshaft angle and, beyond a certain extent of retardation, an instability of the position of the maximum pressure gradient arises.

FIG. 3 illustrates, as a function of the time, how, over a multiplicity of working cycles of the internal combustion engine, the center of combustion HR50 is retarded for engine-related reasons. In the diagram of FIG. 3, the time in seconds is plotted on the abscissa. The crankshaft angle in degrees (°) is plotted on the ordinate for the upper four curves, and the pressure in bar and the pressure gradient in bar/angular degrees, respectively, are plotted on the ordinate for the two lower curves.

The approximately stepped curve represents a setpoint value for the position, or more precisely for the (crankshaft) angular position, of the center of combustion HR50. In the exemplary embodiment illustrated here, at approximately 24 seconds, the angular position of the center of combustion HR50 is to be retarded. This may be realized in practice through a variety of variations of at least one combustion-relevant parameter such as, for example, a shift in the time of the fuel injection (s). The reference sign 352 denotes the associated measurement curve which, aside from a flattening, follows the steps of the setpoint value curve 350 well.

The curve denoted by the reference sign 354 represents the angular position of the maximum of the cylinder internal pressure within the respective working cycles. The reference sign 356 denotes a curve which represents the angular position of the maximum of the pressure gradient within the respective working cycles. It can be clearly seen that, from a time of approximately 30 seconds onward, the angular position of the maximum of the pressure gradient becomes unstable and begins to fluctuate. After the shift of the center of combustion is partially reversed again at approximately 48 seconds, the fluctuations stop, and the angular position of the maximum of the pressure gradient is stable again.

For the sake of completeness, it is also mentioned that the curve denoted by the reference sign 360 represents the maximum pressure occurring in a respective working cycle. The curve 362 represents the steepness of the maximum pressure gradient occurring in a respective working cycle. It can be clearly seen that the pressure gradient, which is significant for the combustion noise, falls already a short time before the start of the instability of the angular position of the maximum of the pressure gradient, and that the combustion noise accordingly becomes quieter.

It is pointed out that, in the case of a further decrease in the pressure gradient, it is no longer the pressure gradient of the combustion but the pressure gradient of the compression that is detected. This abrupt transition is, in the exemplary embodiment illustrated here, used as a threshold for the evaluation of the optimum combustion noise, in order thereby to optimize the parameters that influence the combustion, such as injection pressure, start of injection, number of injections and injection quantity, combustion position and charge pressure, automatically in accordance with the operating point.

Figure 4A:
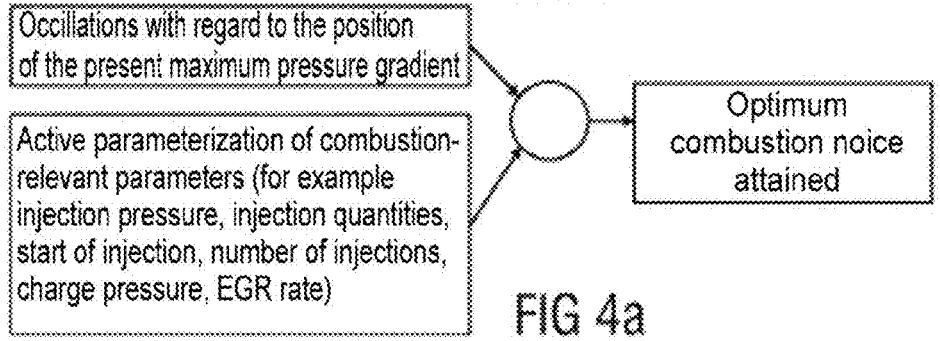
FIG. 4a shows an optimization strategy for the reduction of combustion noise with the aim of obtaining an instability of the position of the maximum pressure gradient within a working cycle.

FIG. 4a shows an optimization strategy for the reduction of combustion noise with the aim of achieving instability of the position of the maximum pressure gradient within a working cycle. In this case, in accordance with a predetermined strategy, the operating state of an internal combustion engine is modified through active parameterization of at least one combustion-relevant parameter such as, for example, the injection pressure, the injection quantity, the start of injection, the number of injections, the charge pressure and/or an exhaust-gas recirculation rate. Said modification is performed until instabilities or fluctuations with regard to the angular position of the present maximum pressure gradient occur within a multiplicity of respectively successive working cycles. The internal combustion engine is then being operated such that optimum, that is to say minimal, combustion noise is generated.

Figure 4B:
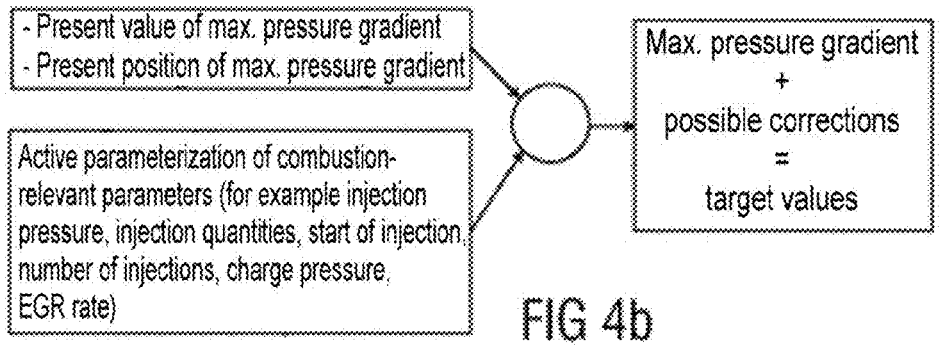
FIG. 4b shows a further optimization strategy for maintaining low combustion noise, wherein a setpoint value of the maximum pressure gradient ascertained previously by means of the optimization strategy illustrated in FIG. 4a, and a corresponding setpoint position for the maximum pressure gradient within a working cycle, are used for active parameterization of combustion-relevant parameters.

FIG. 4b shows a further optimization strategy for maintaining low combustion noise. In this case, it is attempted, through active parameterization of at least one combustion-relevant parameter (see above), to operate the internal combustion engine such that a present value of the maximum pressure gradient, and if appropriate also a present angular position of the maximum pressure gradient, is or are modified such that the value of the maximum pressure gradient and if appropriate also the present angular position assume a setpoint value determined by means of the optimization strategy illustrated in FIG. 4a.

LIST OF REFERENCE SIGNS

100 Device/engine controller
102 Control unit
104 Acquisition unit
106 Ascertainment unit
108 Determination unit
110 Modification unit
222 Current profile for piezo-type injector
222a First pilot injection
222b Second pilot injection
222c Main injection
224 Profile of heat release rate
224a Maximum of the first pilot injection
224b Maximum of the second pilot injection
224c Maximum of the main injection
226 Profile of the heat release
226a Position of the center of combustion HR50
230 Profile of the cylinder internal pressure
230a Maximum of the cylinder internal pressure
230b Maximum gradient of the profile of the cylinder internal pressure
350 Setpoint value for the (crankshaft) angular position
352 Angular position of the center of combustion HR50
354 Angular position of the maximum of the cylinder internal pressure
356 Angular position of the maximum of the pressure gradient
360 Maximum pressure
360 Maximum pressure gradient

What is claimed is:

1. An engine controller for an an auto-ignition internal combustion engine of a motor vehicle, the engine controller comprising:
a device comprising:
a control unit configured to control an operation of the internal combustion engine,
an acquisition unit configured to acquire a pressure profile indicating a pressure in a cylinder of the internal combustion engine over time,
an ascertainment unit configured to ascertain a pressure gradient profile with respect to time of a pressure gradient which is the derivative with respect to time of the acquired profile with respect to time of the pressure,
a determination unit configured to determine a pressure gradient profile indicating a pressure gradient over time, the pressure gradient profile comprising the derivative of the acquired pressure profile, and
a modification unit configured to modify at least one parameter related to combustion of fuel in the internal combustion engine,
wherein the pressure profile is acquired by the acquisition unit the pressure gradient profile is ascertained by the ascertainment unit, and the temporal position of the maximum of the pressure gradient is determined by the determination unit until the temporal position of the maximum of the pressure gradient begins to fluctuate within a multiplicity of successive working cycles of the internal combustion engine.

2. A device for regulating the combustion noise of an auto-ignition internal combustion engine, the device comprising:
a control unit configured to control an operation of the internal combustion engine,
an acquisition unit configured to acquire a pressure profile indicating a pressure in a cylinder of the internal combustion engine over time,
an ascertainment unit configured to ascertain a pressure gradient profile with respect to time of a pressure gradient which is the derivative with respect to time of the acquired profile with respect to time of the pressure,
a determination unit configured to determine a pressure gradient profile indicating a pressure gradient over time, the pressure gradient profile comprising the derivative of the acquired pressure profile, and
a modification unit configured to modify at least one parameter related to combustion of fuel in the internal combustion engine,
wherein the pressure profile is acquired by the acquisition unit the pressure gradient profile is ascertained by the ascertainment unit, and the temporal position of the maximum of the pressure gradient is determined by the determination unit until the temporal position of the maximum of the pressure gradient begins to fluctuate within a multiplicity of successive working cycles of the internal combustion engine.

3. The device of claim 2, wherein the temporal position is determined with reference to a crankshaft angle of the internal combustion engine.

4. The device of claim 2, wherein the at least one parameter relates to a fuel supply path for the internal combustion engine.

5. The device of claim 2, wherein the at least one parameter relates to an air supply path for the internal combustion engine.

6. The device of claim 2, wherein the internal combustion engine is operated with multiple injection processes in each working cycle, and wherein the temporal position of the maximum of the pressure gradient within the multiplicity of successive working cycles is assigned to different injection processes.

7. The device of claim 2, wherein the modification unit is further configured to perform a renewed modification of the at least one parameter until the temporal position of the maximum of the pressure gradient is stable again within a multiplicity of successive working cycles of the internal combustion engine.

8. The device of claim 7, further comprising a storage device configured to store the value and the temporal position of the maximum pressure gradient within a working cycle as a setpoint value or setpoint position after the temporal position of the maximum of the pressure gradient is stable again within a multiplicity of successive working cycles of the internal combustion engine after the renewed modification of the at least one parameter, and
wherein the control unit is further configured to operate the internal combustion engine such that at least one of:
(i) the value of the maximum pressure gradient within a working cycle is at least approximately the setpoint value, and
(ii) the temporal position of the maximum pressure gradient within a working cycle is at least approximately the setpoint position.

9. A method for regulating the combustion noise of an auto-ignition internal combustion engine, the method comprising:
operating the internal combustion engine,
acquiring a pressure profile indicating a pressure in a cylinder of the internal combustion engine over time,
determining a pressure gradient profile indicating a pressure gradient over time, the pressure gradient profile comprising the derivative of the acquired pressure profile,
determining a temporal position of a maximum of the pressure gradient in the determined pressure gradient profile, and
modifying at least one parameter related to combustion of fuel in the internal combustion engine,
wherein the pressure profile is acquired, the pressure gradient profile is determined, and the temporal position of the maximum of the pressure gradient is determined until the temporal position of the maximum of the pressure gradient begins to fluctuate within a multiplicity of successive working cycles of the internal combustion engine.

10. The method of claim 9, wherein the temporal position is determined with reference to a crankshaft angle of the internal combustion engine.

11. The method of claim 9, wherein the at least one parameter relates to a fuel supply path for the internal combustion engine.

12. The method of claim 9, wherein the at least one parameter relates to an air supply path for the internal combustion engine.

13. The method of claim 9, wherein the internal combustion engine is operated with multiple injection processes in each working cycle, and wherein the temporal position of the maximum of the pressure gradient within the multiplicity of successive working cycles is assigned to different injection processes.

14. The method of claim 9, further comprising a renewed modification of the at least one parameter until the temporal position of the maximum of the pressure gradient is stable again within a multiplicity of successive working cycles of the internal combustion engine.

15. The method of claim 14, further comprising:
storing the value and the temporal position of the maximum pressure gradient within a working cycle as a setpoint value or setpoint position after the temporal position of the maximum of the pressure gradient is stable again within a multiplicity of successive working cycles of the internal combustion engine after the renewed modification of the at least one parameter, and
operating the internal combustion engine such that at least one of:
(i) the value of the maximum pressure gradient within a working cycle is at least approximately the setpoint value, and
(ii) the temporal position of the maximum pressure gradient within a working cycle is at least approximately the setpoint position.

* * * * *